US012117681B2

(12) United States Patent
Chen et al.

(10) Patent No.: US 12,117,681 B2
(45) Date of Patent: Oct. 15, 2024

(54) LIGHT-ADJUSTING STRUCTURE, MANUFACTURING METHOD THEREOF, AND LIGHT-ADJUSTING MODULE

(71) Applicants: Beijing BOE Sensor Technology Co., Ltd., Beijing (CN); BOE Technology Group Co., Ltd., Beijing (CN)

(72) Inventors: Juan Chen, Beijing (CN); Jing Yu, Beijing (CN); Chunlei Wang, Beijing (CN); Yifan Wu, Beijing (CN); Yingliang Zhang, Beijing (CN); Zhilong Peng, Beijing (CN); Wei Liu, Beijing (CN); Qiang Liu, Beijing (CN); Na Li, Beijing (CN); Chuncheng Che, Beijing (CN); Xue Cao, Beijing (CN); Yue Li, Beijing (CN); Xinya Zhang, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 149 days.

(21) Appl. No.: 17/764,908

(22) PCT Filed: May 19, 2021

(86) PCT No.: PCT/CN2021/094601
§ 371 (c)(1),
(2) Date: Mar. 29, 2022

(87) PCT Pub. No.: WO2022/001450
PCT Pub. Date: Jan. 6, 2022

(65) Prior Publication Data
US 2022/0373835 A1    Nov. 24, 2022

(30) Foreign Application Priority Data
Jun. 29, 2020   (CN) .......................... 202010607321.3

(51) Int. Cl.
*G02F 1/1333* (2006.01)
*G02F 1/1337* (2006.01)
(Continued)

(52) U.S. Cl.
CPC ...... *G02F 1/133305* (2013.01); *G02F 1/1337* (2013.01); *G02F 1/1339* (2013.01); *G02F 1/134309* (2013.01)

(58) Field of Classification Search
CPC .............. G09F 9/301; G02F 1/133305; H01L 51/0097; G06F 1/1652; G09G 2380/02
See application file for complete search history.

(56) References Cited

U.S. PATENT DOCUMENTS 5,687,465 A    11/1997 Hinata et al.
2006/0274220 A1*  12/2006 Kim .................... G02F 1/13394
                                                              349/56
(Continued)

FOREIGN PATENT DOCUMENTS

CN    102596565 A    7/2012
CN    102654692 A    9/2012
(Continued)

OTHER PUBLICATIONS

CN 202010607321.3 first office action.
PCT/CN2021/094601 international search report and written opinion.

*Primary Examiner* — Jonathan Y Jung
(74) *Attorney, Agent, or Firm* — IPro, PLLC (57) ABSTRACT

A light-adjusting structure, a method for manufacturing the light-adjusting structure, and a light-adjusting module are provided, which belong to the field of display technology, the light-adjusting structure includes: a first flexible substrate and a second flexible substrate oppositely arranged; a first transparent electrode and a second transparent electrode which are located between the first flexible substrate and the (Continued)

second flexible substrate; a first alignment layer located on a side of the first flexible substrate facing towards the second flexible substrate; a second alignment layer located on a side of the second flexible substrate facing towards the first flexible substrate; and a spacer and a dye liquid crystal layer which are located between the first alignment layer and the second alignment layer. The solutions of the present disclosure can meet light-adjusting requirements of vehicle windows.

15 Claims, 6 Drawing Sheets

(51) Int. Cl.
*G02F 1/1339* (2006.01)
*G02F 1/1343* (2006.01)

(56) References Cited

U.S. PATENT DOCUMENTS

| | | | | |
|---|---|---|---|---|
| 2010/0296027 | A1* | 11/2010 | Matsuhira | G02F 1/133308 349/158 |
| 2011/0025934 | A1* | 2/2011 | McCarthy | G02F 1/132 349/20 |
| 2012/0156457 | A1 | 6/2012 | Kondo | |
| 2012/0286276 | A1* | 11/2012 | Yamazaki | H01L 27/1248 257/E33.053 |
| 2018/0134007 | A1 | 5/2018 | Lee et al. | |
| 2019/0121186 | A1* | 4/2019 | Miura | G02F 1/13394 |
| 2019/0162991 | A1* | 5/2019 | Hagiwara | G02F 1/1335 |
| 2020/0124900 | A1 | 4/2020 | Zhou et al. | |
| 2020/0183222 | A1* | 6/2020 | Yoon | G09G 3/342 |
| 2021/0018667 | A1* | 1/2021 | Seo | G02B 5/3083 |
| 2021/0294153 | A1 | 9/2021 | Cheng et al. | |

FOREIGN PATENT DOCUMENTS

| | | |
|---|---|---|
| CN | 103197476 A | 7/2013 |
| CN | 104090409 A | 10/2014 |
| CN | 104962120 A | 10/2015 |
| CN | 107641516 A | 1/2018 |
| CN | 207689776 U | 8/2018 |
| CN | 108594509 A | 9/2018 |
| CN | 108663839 A | 10/2018 |
| CN | 209297065 U | 8/2019 |
| CN | 110441933 A | 11/2019 |
| CN | 111624800 A | 9/2020 |
| IN | 108074490 A | 5/2018 |
| IN | 209674156 U | 11/2019 |

\* cited by examiner

LIGHT-ADJUSTING STRUCTURE, MANUFACTURING METHOD THEREOF, AND LIGHT-ADJUSTING MODULE

CROSS-REFERENCE TO RELATED APPLICATIONS

This application is the U.S. national phase of PCT Application No. PCT/CN2021/094601 filed on May 19, 2021, which claims priority to Chinese Patent Application No. 202010607321.3 filed in China on Jun. 29, 2020, the disclosure of which is incorporated herein by reference in its entirety.

TECHNICAL FIELD

The present disclosure relates to the field of display technology, and in particular, to a light-adjusting structure, a manufacturing method thereof, and a light-adjusting module.

BACKGROUND

For a vehicle window, the following requirements need to be met: double-curved; the vehicle window is light and thin for energy saving, and is not fragile for safety. A conventional vehicle windows is generally an ordinary window that is glass-based and has non-adjustable transmittance. The light-adjusting structure generally includes a flexible PDLC (polymer dispersed liquid crystal), a flexible EPD (electrophoretic display technology), a flexible ECD (electrochromic technology), and a rigid liquid crystal light-adjusting structure. The PDLC is commonly used in the field of buildings on the market, and can achieve a switching between transparent and milky white. Due to the liquid crystal properties of the PDLC, the milky white color is difficult to match the color of a vehicle body and the PDLC has a large haze (>10%), the application of the PDLC in the field of vehicles is thus limited. The flexible EPD is difficult to meet safety standards for the vehicle due to the high haze of ink particles. The flexible ECD is also difficult to applied in traffic applications due to a limitation of long response time of EC (electrochromic) materials which response characteristics is in second order. For the rigid light-adjusting structure with dye liquid crystal, although the color, the response time, and the haze can meet the requirements of traffic applications, but the glass substrate is fragile, which cannot meet the requirement of vehicle window such as non-fragile for safety. In addition, there is a difficulty in terms of double-curved spherification for the rigid light-adjusting structure with dye liquid crystal.

SUMMARY

The present disclosure is to provide a light-adjusting structure, a manufacturing method thereof, and a light-adjusting module, which can satisfy light-adjusting requirements of a vehicle window.

In order to achieve this, embodiments of the present disclosure provide the following technical solutions.

In a first aspect, a light-adjusting structure is provided, including:
a first flexible substrate and a second flexible substrate, the first flexible substrate and the second flexible substrate being oppositely arranged;
a first transparent electrode and a second transparent electrode, the first transparent electrode and the second transparent electrode being located between the first flexible substrate and the second flexible substrate;
a first alignment layer, located at a side of the first flexible substrate facing towards the second flexible substrate;
a second alignment layer, located at a side of the second flexible substrate facing towards the first flexible substrate; and
a spacer and a dye liquid crystal layer, the spacer and the dye liquid crystal layer being located between the first alignment layer and the second alignment layer.

In some embodiments, the first transparent electrode is located at a side of the first flexible substrate facing towards the second flexible substrate;
the second transparent electrode is located at a side of the second flexible substrate facing towards the first flexible substrate.

In some embodiments, the first transparent electrode is a full layer of planar electrode; or
the first transparent electrode includes a plurality of block-shaped sub-electrodes independent of one another; or
the first transparent electrode includes a plurality of character-patterned sub-electrodes independent of one another.

In some embodiments, a spacing between adjacent block-shaped sub-electrodes of the plurality of block-shaped sub-electrodes is greater than or equal to 40 μm;
a spacing between adjacent character-patterned sub-electrodes of the plurality of character-patterned sub-electrodes is greater than or equal to 2 μm.

In some embodiments, a thickness of the light-adjusting structure is 0.15 mm to 0.38 mm.

In some embodiments, a thickness of the first flexible substrate is 40 μm to 200 μm, a thermal shrinkage of the first flexible substrate in an x-axis direction is less than or equal to 0.03%, a thermal shrinkage of the first flexible substrate in a y-axis direction is less than or equal to 0.03%, a transmittance of the first flexible substrate is greater than 80%, a radius of curvature of the first flexible substrate in the x-axis direction is greater than 1800 mm, and a radius of curvature of the first flexible substrate in the y-axis direction is greater than 2000 mm;
a thickness of the second flexible substrate is 40 μm to 200 μm, a thermal shrinkage rate of the second flexible substrate in the x-axis direction is less than or equal to 0.03%, a thermal shrinkage rate of the second flexible substrate in the y-axis direction is less than or equal to 0.03%, a transmittance of the second flexible substrate is greater than 80%, a radius of curvature of the second flexible substrate in the x-axis direction is greater than 1800 mm, and a radius of curvature of the second flexible substrate in the y-axis direction is greater than 2000 mm.

In some embodiments, a temperature tolerance of the first flexible substrate is in a range of 100 degrees centigrade to 170 degrees centigrade, a temperature tolerance of the second flexible substrate is in a range of 100 degrees centigrade to 170 degrees centigrade, a temperature tolerance of the first alignment layer is in a range of 100 degrees centigrade to 130 degrees centigrade, a temperature tolerance of the second alignment layer is in a range of 100 degrees centigrade to 130 degrees centigrade, a curing temperature of the spacer is in a range of 90 degrees centigrade to 110 degrees centigrade, and a temperature tolerance of the dye liquid crystal is in a range of −40 degrees centigrade to 150 degrees centigrade.

Embodiments of the present disclosure also provide a light-adjusting module which includes a light-adjusting structure as described above.

In some embodiments, the light-adjusting module further includes:
a flexible circuit board bonded to the light-adjusting structure, wherein the flexible circuit board is bonded to the light-adjusting structure by an ACF adhesive, and a diameter of a gold particle in the ACF adhesive is greater than 20 μm.

In some embodiments, the light-adjusting module further includes a first tempered glass and a second tempered glass oppositely arranged, wherein the light-adjusting structure is located between the first tempered glass and the second tempered glass, and the light-adjusting structure is fixed at a side of the first tempered glass facing towards the second tempered glass by an adhesive layer.

In some embodiments, the light-adjusting structure and the second tempered glass are spaced apart with a distance; or
a side of the light-adjusting structure away from the first tempered glass is fixed to the second tempered glass by the adhesive layer.

In some embodiments, the light-adjusting module further includes:
a tempered glass, wherein light-adjusting structure is fixed to the tempered glass by the adhesive layer;
a protective film, covering the light-adjusting structure.

Embodiments of the present disclosure also provide a method for manufacturing the light-adjusting structure, which includes:
providing a first rigid substrate;
forming a first bonding layer on the first rigid substrate;
forming a first flexible substrate on the first bonding layer;
forming a first transparent electrode on the first flexible substrate;
forming a first alignment layer and a spacer at a side of the first transparent electrode away from the first flexible substrate;
providing a second rigid substrate;
forming a second bonding layer on the second rigid substrate;
forming a second flexible substrate on the second bonding layer;
forming a second transparent electrode on the second flexible substrate;
forming a second alignment layer at a side of the second transparent electrode away from the second flexible substrate;
cell-assembling the first rigid substrate with the second rigid substrate, and forming a dye liquid crystal layer between the first alignment layer and the second alignment layer; and
separating the first rigid substrate and the first bonding layer from the first flexible substrate, and separating the second rigid substrate and the second bonding layer from the second flexible substrate.

In some embodiments, the step of forming the first transparent electrode includes:
forming a full layer of planar electrode; or
forming a plurality of block-shaped sub-electrodes independent of one another; or
forming a plurality of character-patterned sub-electrodes independent of one another.

DESCRIPTION OF REFERENCE SIGNS IN THE ACCOMPANY DRAWINGS

11 First rigid substrate
12 Second rigid substrate
21 First bonding layer
22 Second bonding layer
31 First flexible substrate
32 Second flexible substrate
41 First transparent electrode
42 Second transparent electrode
51 First alignment layer
52 Second alignment layer
6 Spacer
7 Dye liquid crystal layer
8 First tempered glass
9 Second tempered glass
10 Adhesive layer
11 Light-adjusting structure
12 Protective film
13 Flexible circuit board
14 First flexible circuit board
15 Second flexible circuit board

DETAILED DESCRIPTION

In order to make the technical issues, technical solutions, and advantages of the present disclosure clearer, a detailed description will be given below with reference to the accompanying drawings and specific embodiments.

Embodiments of the present disclosure provide a light-adjusting structure and a manufacturing method thereof, and a light-adjusting module, which can satisfy light-adjusting requirements of a vehicle window.

Figure 1:
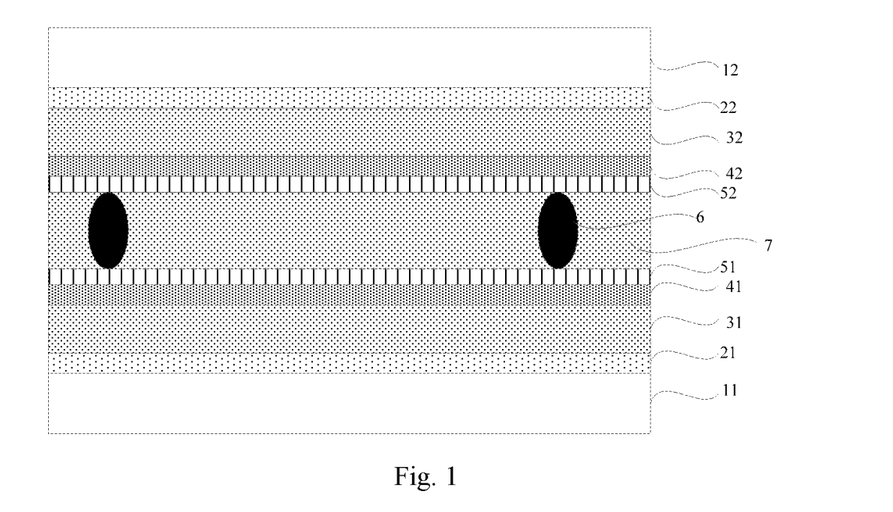
FIG. 1 is a schematic diagram of a light-adjusting structure manufactured by embodiments of the present disclosure.
Figure 2:
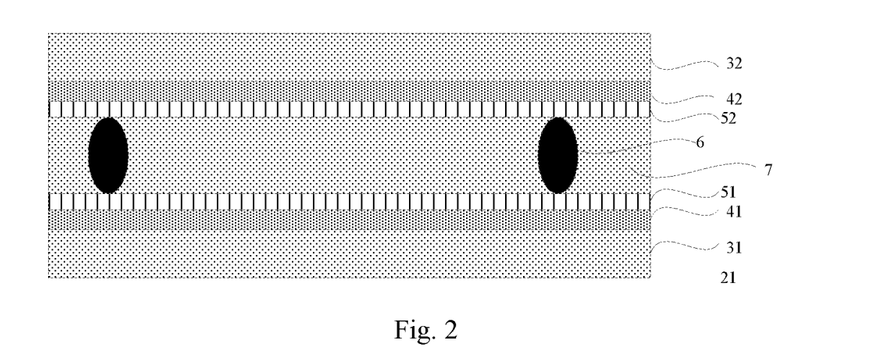
FIG. 2 is a schematic diagram of a light-adjusting structure according to embodiments of the present disclosure.

Embodiments of the present disclosure provide a light-adjusting structure as shown in FIGS. 1 and 2, the light-adjusting structure includes:
a first flexible substrate 31 and a second flexible substrate 32, which are oppositely arranged;
a first transparent electrode 41 and a second transparent electrode 42, which are located between the first flexible substrate 31 and the second flexible substrate 32;
a first alignment layer 51, located at a side of the first flexible substrate 31 facing towards the second flexible substrate 32;
a second alignment layer 52, located at a side of the second flexible substrate 32 facing towards the first flexible substrate 31; and
a spacer 6 and a dye liquid crystal layer 7, which are located between the first alignment layer 51 and the second alignment layer 52.

In the present embodiment, the light-adjusting structure uses flexible substrates, which can meet the requirement for the curvature of the vehicle window. Further, the flexible substrate is not fragile and does not pose a threat to human safety, which can meet the safety requirement for the vehicle window. Furthermore, the light-adjusting structure includes the dye liquid crystal layer 7 to realize displaying of various colors, so that the color can match with that of the vehicle body well. The response time can reach a millisecond order, which can meet the fast response requirement for the vehicle window. In addition, the haze value of the light-adjusting structure is low, which can meet the requirement of safety standards for the vehicle.

As shown in FIGS. 1 and 2, the first transparent electrode 41 may be located on a side of the first flexible substrate 31 facing towards the second flexible substrate 32; the second transparent electrode 42 may be located on a side of the second flexible substrate 32 facing towards the first flexible substrate 31. Alternatively, the first transparent electrode 41 and the second transparent electrode 42 may both be located on the same flexible substrate.

A first rigid substrate 11, a second rigid substrate 12, a first bonding layer 21, and a second bonding layer 22 are all carriers in the process of manufacturing the light-adjusting structure, and the first rigid substrate 11, the second rigid substrate 12, the first bonding layer 21, and the second bonding layer 22 need to be removed after the manufacturing of the light-adjusting structure is completed.

With the light-adjusting structure of the present embodiment, a switching between a transparent state and a black state can be achieved, a better matching with the vehicle body can be realized when compared with a flexible PDLC (which may realize a switching between transparent and milky white), and the haze of the light-adjusting structure can be less than 1%, which can make an occupant in the vehicle to see the environment outside the vehicle more clearly, and thus can satisfy the safety requirement more when compared with the flexible PDLC. When compared with a flexible EPD, the light-adjusting structure of the present embodiment has a smaller haze, and can achieve a double-curved structure, which can meet the requirement for the curvature of the vehicle window. When compared with a flexible ECD (with a response speed of 0.1 s to 0.9 s), the response speed of the liquid crystal in the light-adjusting structure according to the present embodiment can be less than 40 ms, which can meet the fast response requirement for the vehicle window.

When the light-adjusting structure of the present embodiment is applied to the vehicle window, the light-adjusting structure needs to be disposed between double-curved tempered glasses with a thickness of 4 mm. If the thickness of the light-adjusting structure and the hardness thereof are too small, and the supporting property thereof is poor, handling such a vehicle window would not be easy and an operation for combining with the glasses would be difficult, and an abnormality such as tearing may occur during the double-curving operation. Therefore, an overall thickness of the light-adjusting structure needs to be greater than 100 μm, and the thickness of the dye liquid crystal layer 7 of the light-adjusting structure may be 6 μm to 50 μm. In addition, the thickness of the light-adjusting structure cannot be too large because the thickness of the vehicle window is limited, and the thickness of the light-adjusting structure cannot be more than 0.38 mm according to the thickness requirement for the vehicle window. Specifically, the thickness of the light-adjusting structure may be 0.15 mm to 0.38 mm, and in particular, may be 100 μm or 125 μm.

The first flexible substrate 31 and the second flexible substrate 32 of the present embodiment may be made of any of PET (polyethylene terephthalate), COP (cyclic olefin polymer), CPI (transparent polyimide), or TAC (triacetate). When the light-adjusting structure is applied to the vehicle window, the first flexible substrate 31 and the second flexible substrate 32 do not break when the vehicle encounters an impact and do not threaten the safety of an occupant in the vehicle. In order to meet curvature requirement for the vehicle window, the first flexible substrate 31 and the second flexible substrate 32 need to have a radius of curvature in an x-axis direction that is greater than 1800 mm, and a radius of curvature in a y-axis direction that is greater than 2000 mm.

The thickness of the first flexible substrate 31 and the thickness of the second flexible substrate 32 may be 40 μm to 200 μm, the thermal shrinkage rate of the first flexible substrate 31 and that of the second flexible substrate 32 in the x-axis direction are less than or equal to 0.03%, and the thermal shrinkage rate of the first flexible substrate 31 and that of the second flexible substrate 32 in the y-axis direction are less than or equal to 0.03%; if the thermal shrinkage rate of the first flexible substrate 31 and that of the second flexible substrate 32 are greater than 0.03%, the first flexible substrate 31 and the second flexible substrate 32 would have a large deformation at a high temperature of 110 degrees centigrade or more, while the thermal shrinkage rate of the rigid substrate, such as a glass substrate, is almost negligible. In a case that the first flexible substrate 31 and the second flexible substrate 32 are attached to the rigid substrate, the rigid substrate may be warped due to the thermal shrinkage of the first flexible substrate 31 and the second flexible substrate 3, resulting in that the whole process cannot be carried out. Therefore, it is required that the first flexible substrate 31 and the second flexible substrate 32 cannot undergo a large deformation when being heated in the case that they are attached to the rigid substrate, and therefore, the thermal shrinkage of the first flexible substrate 31 and that of the second flexible substrate 32 in the x-axis direction are less than or equal to 0.03%, and the thermal shrinkage of the first flexible substrate 31 and that of the second flexible substrate 32 in the y-axis direction are less than or equal to 0.03%. Specifically, the first flexible substrate 31 and the second flexible substrate 32 may have a thermal shrinkage rate of 0.002% in the x-axis direction and a thermal shrinkage rate of 0.002% in the y-axis direction.

In the present embodiment, in order to ensure the transmittance of the light-adjusting structure, the electrode includes a transparent conductive material such as ITO, and the transmittance of the first flexible substrate 31 and that of the second flexible substrate 32 are greater than 80%.

In order to ensure the performance of the light-adjusting structure, the square resistance of the first transparent electrode 41 and the second transparent electrode 42 can be in the range of 20Ω/□ to 200Ω/□.

In the light-adjusting structure of the present embodiment, the temperature tolerance range of the first flexible substrate 31 and that of the second flexible substrate 32 are 100 degrees centigrade to 170 degrees centigrade. Since the first flexible substrate 31 and the second flexible substrate 32 with a temperature tolerance of 170 degrees centigrade or less are used, and the temperature tolerance of the first bonding layer 21 and that of the second bonding layer 22 are also less than 120 degrees centigrade, the light-adjusting structure of the present embodiment is manufactured by a low temperature process. In the present embodiment, the first flexible substrate 31 and the second flexible substrate 32 are attached to the first rigid substrate 11 and the second rigid substrate 12 through the first bonding layer 21 and the second bonding layer 22 when manufacturing the light-adjusting structure. Since the temperature tolerance range of the first flexible substrate 31 and that of the second flexible substrate 32 are 100 degrees centigrade to 170 degrees centigrade, the de-bonding temperature of the first bonding layer 21 and that of the second bonding layer 22 need to be lower than 170 degrees centigrade, such as lower than 150 degrees centigrade, otherwise the first flexible substrate 31 and the second flexible substrate 32 would be easily damaged. If the de-bonding temperature of the first bonding layer 21 and that of the second bonding layer 22 are lower than 150 degrees centigrade, it is required that the temperature of the other processes has a temperature difference of at least 40 degrees centigrade from the de-bonding temperatures of the first bonding layer 21 and the second bonding layer 22, otherwise the first bonding layer 21 and the second bonding layer 22 will be partially de-bonded during such processes, affecting the normal manufacturing of the product. Therefore, all the process temperatures and material temperatures preferably satisfy the temperature requirement of 110 degrees centigrade or less, i.e., the light-adjusting structure can be manufactured below 110 degrees centigrade.

The temperature tolerance range of the first alignment layer 51 and that of the second alignment layer 52 are 100 degrees centigrade to 130 degrees centigrade, and specifically the first alignment layer 51 and the second alignment layer 52 may be a normally white liquid crystal alignment film with a curing temperature of 100 degrees centigrade and a curing time of about 90 s. The spacer 6 may be made of a spacer material with a curing temperature of 90 degrees centigrade to 110 degrees centigrade, and in particular, a black spacer material that is sticky and has a curing temperature of 110 degrees centigrade and a curing time of 1 hour may be used in the present embodiment, and the black spacer material needs to be melted and then bonded to the flexible substrate at 110 degrees centigrade or less, to support the thickness of the box without sliding.

The light-adjusting structure of this embodiment is manufactured by a low temperature process, and the film layer material used is a material for the low temperature process, which can not only prevent the first flexible substrate 31 and the second flexible substrate 32 from being damaged, but also prevent the first bonding layer 21 and the second bonding layer 22 from being subjected to adverse reactions in case of over-temperature, resulting in a difficulty in peeling the first flexible substrate 31 off from the first rigid substrate 11 and peeling the second flexible substrate 32 off from the second rigid substrate 12 during the manufacturing process.

In this embodiment, the dye liquid crystal may be made of a dye liquid crystal with a temperature tolerance range of −40 degrees centigrade to 150 degrees centigrade, and the liquid crystal at a high temperature of 150 degrees centigrade may recover to a normal operating state after 1 hour without affecting the reliability; there is no dye crystallization for liquid crystal at −40° C., and the liquid crystal can operate normally after recovery to the normal temperature without damaging device orientation and optical performance.

In the present embodiment, the first transparent electrode 41 and the second transparent electrode 42 may be a full layer of planar electrode, which can achieve a function of light-adjusting for the whole surface. The first transparent electrode 41 may also include a plurality of mutually independent block-shaped sub-electrodes, so that a function of light-adjusting for separated regions can be realized; the plurality of mutually independent block-shaped sub-electrodes can be formed by etching a full layer of electrode with a laser, and a wavelength range of the laser can be 200 nm to 380 nm. The function of light-adjusting for separated regions can be realized by independently controlling each block-shaped sub-electrode, that is, a certain region of the light-adjusting structure may be selectively lighted up for light-adjusting for that region, and other parts maintain a transparent state or a black state, and a driving voltage may be 0 V to 24 V. In order to avoid a mutual influence of adjacent separated regions, the spacing between the adjacent block-shaped sub-electrodes is greater than or equal to 40 μm. It is also possible to perform a complex patterning process on the first transparent electrode 41, so that a simple character, such as information about the electric quantity, temperature, and time of a vehicle, may be displayed by the first transparent electrode 41, and the first transparent electrode 41 includes a plurality of mutually independent character-patterned sub-electrodes. Specifically, the character-patterned sub-electrodes may be made by processes such as exposure, development and etching. In order to prevent the first flexible substrate 31 and the second flexible substrate 32 from being damaged, and in addition, preventing the first bonding layer 21 and the second bonding layer 22 from being subjected to an adverse reaction due to an excessively high temperature, the annealing temperature is less than or equal to 150 degrees centigrade when forming a transparent electrode material layer. In order to avoid a mutual influence of adjacent character patterns, a spacing between the adjacent character-patterned sub-electrodes is greater than or equal to 2 μm. a PM (passive) driving mode with a chip may be used to achieve dynamic displaying of different information, and the driving voltage is adjustable between 0 and 16 V. It should be noted that the overall transmittance of the light-adjusting structure needs to be higher than 40%.

Embodiments of the present disclosure also provide a light-adjusting module which includes the light-adjusting structure as described above.

The light-adjusting module further includes:
  a flexible circuit board bonded to the light-adjusting structure, where the flexible circuit board is bonded to the light-adjusting structure by an ACF (anisotropic conductive) adhesive.

A diameter of a gold particle in the ACF adhesive is greater than 20 μm. If the diameter of the gold particle in the ACF adhesive is small, such as less than 15 μm, the requirement for flexible bonding cannot be met, because if the diameter of the gold particles is too small, whether the gold particle are open cannot be determined through the flexible substrate, and the effectiveness of the gold particle cannot be determined. An obvious opening condition of the gold particle may be seen through the flexible substrate only in a case that the diameter of the gold particle is increased, and the effectiveness of a pressing process may be determined.

Figure 3:
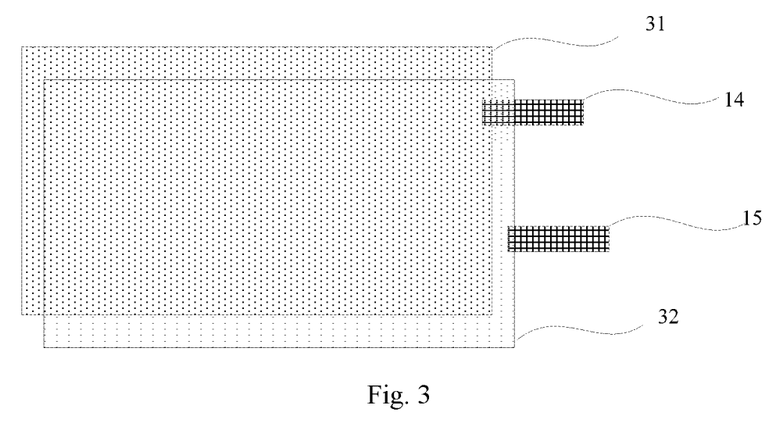
FIG. 3 to FIG. 5 are schematic diagrams of bonding a light-adjusting structure to a flexible circuit board according to embodiments of the present disclosure.
Figure 4:
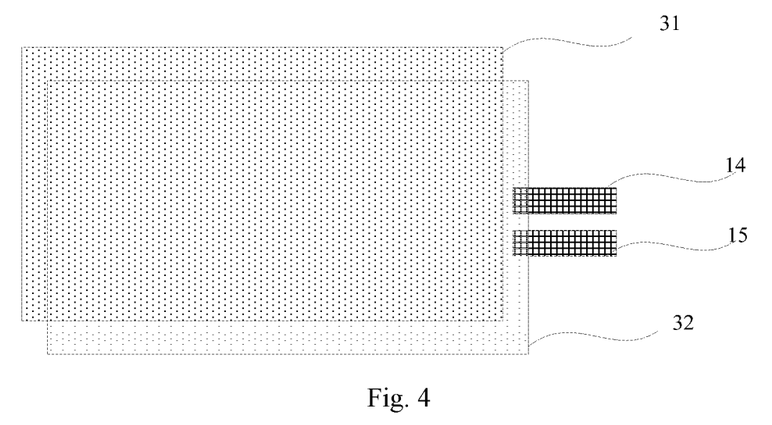
Figure 5:
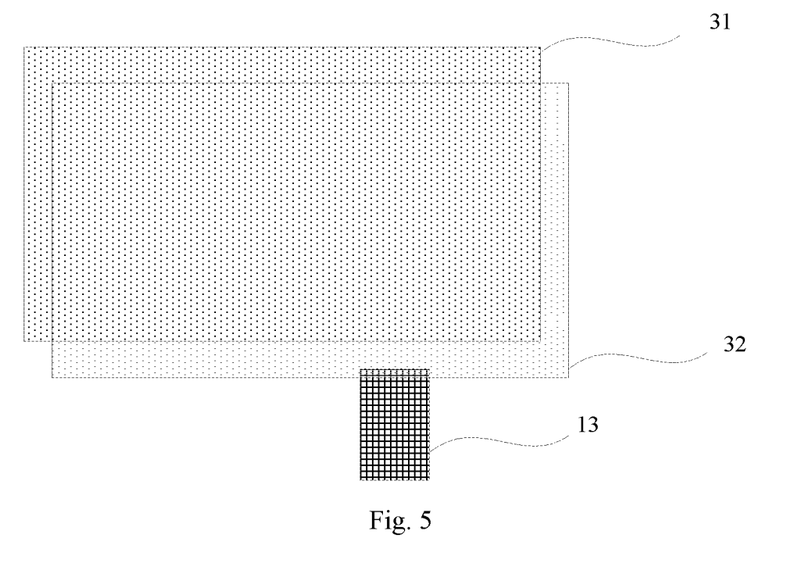

In the bonding of the flexible circuit boards, the bonding temperature may be 200 degrees centigrade to 320 degrees centigrade, for example, may be 240 degrees centigrade. The bonding time may be 10 s to 20 s, for example, 10 s. Because the first flexible substrate 31 and the second flexible substrate 32 have the temperature tolerance of 150 degrees centigrade, and a high temperature of 200 degrees centigrade to 320 degrees centigrade cannot cause a destructive damage to the first flexible substrate 31 and the second flexible substrate 32 in a short time (10 s to 20 s). The bonding may be weak if the bonding time is too short, and the first flexible substrate 31 and the second flexible substrate 32 may be subjected to a deformation damage if the bonding time is too long. The bonding pressure may be 2 kgf to 5 kgf, for example, 4.5 kgf. The bonding of flexible circuit boards is not firm if the bonding pressure is too small, and the first flexible substrate 31 and the second flexible substrate 32 may be penetrated and thus cannot operates normally if the bonding pressure is too large.

As shown in FIG. 3, in one possible bonding manner, a first flexible circuit board 14 is bonded to a bonding region on the first flexible substrate 31, and a second flexible circuit board 15 is bonded to a bonding region on the second flexible substrate 32. Alternatively, as shown in FIG. 4, in another possible bonding manner, the first flexible circuit board 14 and the second flexible circuit board 15 are both bonded to the bonding region on the second flexible substrate 32, and the first transparent electrode 41 on the first flexible substrate 31 is connected to the bonding region on the second flexible substrate 32. Alternatively, as shown in FIG. 5, the first transparent electrode 41 on the first flexible substrate 31 is connected to the bonding region on the second flexible substrate 32, and the flexible circuit board 13 is bonded to the bonding region on the second flexible substrate 32.

Figure 6:
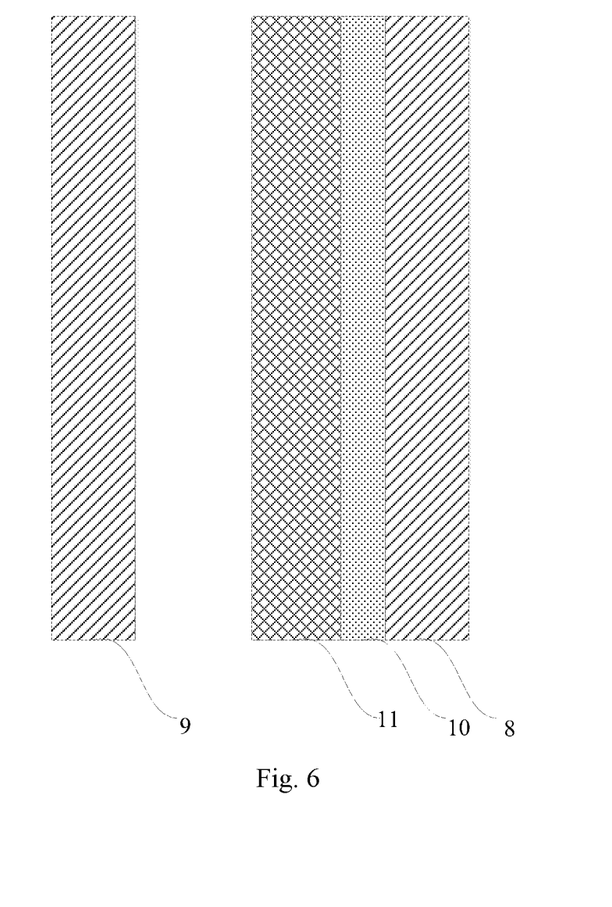
FIG. 6 to FIG. 8 are schematic diagrams of light-adjusting modules according to embodiments of the present disclosure.
Figure 7:
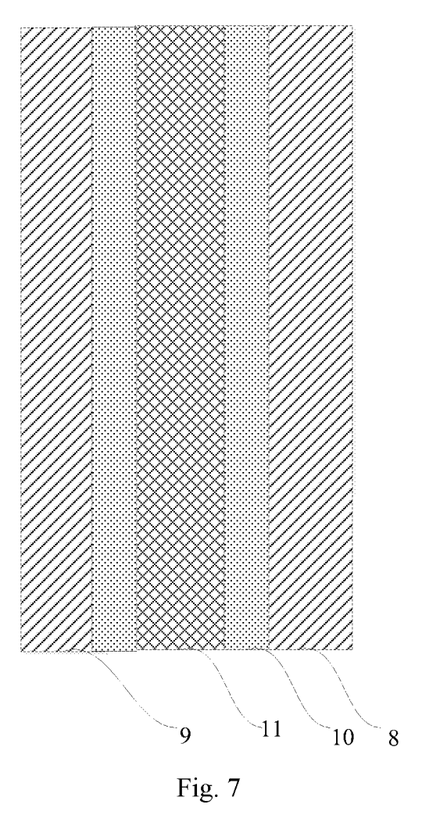
Figure 8:
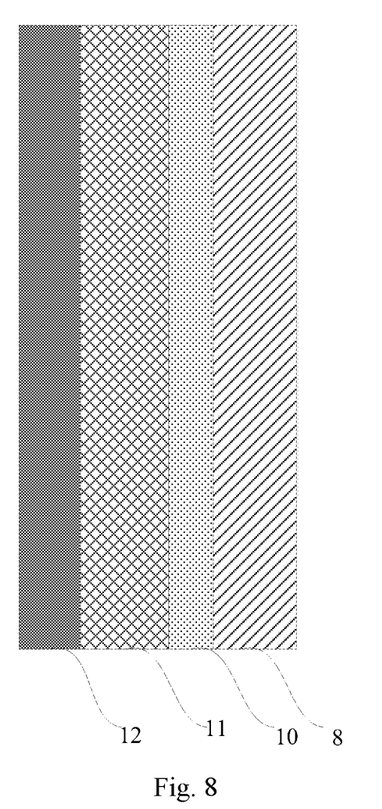

The light-adjusting module of this embodiment can be applied in the vehicle window as well as in other configurations where light-adjusting is required. When the light-adjusting module is applied in the vehicle window, the light-adjusting module further includes a tempered glass. In an embodiment, as shown in FIG. 6, the light-adjusting module includes a first tempered glass 8 and a second tempered glass 9 which are oppositely arranged, the light-adjusting structure 11 is located between the first tempered glass 8 and the second tempered glass 9, the light-adjusting structure 11 is fixed at a side of the first tempered glass 8 facing towards the second tempered glass 9 by an adhesive layer 10, and the light-adjusting structure 11 is located at a distance from the second tempered glass 9. In another embodiment, as shown in FIG. 7, the light-adjusting module includes the first tempered glass 8 and the second tempered glass 9 which are oppositely arranged, the light-adjusting structure 11 is located between the first tempered glass 8 and the second tempered glass 9, the light-adjusting structure 11 is fixed at a side of the first tempered glass 8 facing towards the second tempered glass 9 by an adhesive layer 10, and a side of the light-adjusting structure 11 away from the first tempered glass 8 is fixed to the second tempered glass 9 by the adhesive layer 10. In yet another embodiment, as shown in FIG. 8, the light-adjusting module includes the first tempered glass 8, the light-adjusting structure 11 is fixed on the tempered glass an adhesive layer 10, and the light-adjusting module further includes a protective film 12 covering the light-adjusting structure 11.

The light-adjusting module with different structures may be used according to different vehicle types, and in the above-mentioned embodiments, the thickness of the tempered glasses is 4 mm to 12 mm, for example, 4 mm; the adhesive layer 10 may be made of any of PVB (polyvinyl butyral) or CCF (polypropylene) or OCA (optical adhesive) or SGP (SentryGlas Plus) or EVA (ethylene-vinyl acetate copolymer), etc. The thickness of the adhesive layer may be 0.3 mm to 0.9 mm, for example, 0.78 mm. The thickness of the light-adjusting structure is 0.15 mm to 0.38 mm, for example, 0.15 mm, and the thickness of the protective film 12 is 100 μm to 600 μm, for example, 110 μm.

In an example in which the adhesive layer 10 is made by PVB, when manufacturing the light-adjusting module, the tempered glass is firstly treated, i.e., the tempered glass is subjected to hot bending to cause the tempered glass to have a certain curvature, a PVB is formed on the first tempered glass 8, the light-adjusting structure is fixed by the PVB, then a PVB is formed on the light-adjusting structure. The second tempered glass 9 is laminated with the above-mentioned structure, to obtain the light-adjusting module.

Embodiments of the present disclosure also provide a method for manufacturing the light-adjusting structure, as shown in FIG. 1, the method includes:
providing a first rigid substrate 11;
forming a first bonding layer 21 on the first rigid substrate 11;
forming a first flexible substrate 31 on the first bonding layer 21;
forming a first transparent electrode 41 on the first flexible substrate 31;
forming a first alignment layer 51 and a spacer 6 at a side of the first transparent electrode 41 away from the first flexible substrate 31;
providing a second rigid substrate 12;
forming a second bonding layer 22 on the second rigid substrate 12;
forming a second flexible substrate 32 on the second bonding layer 22;
forming a second transparent electrode 42 on the second flexible substrate 32;
forming a second alignment layer 52 at a side of the second transparent electrode 42 away from the second flexible substrate 32;
aligning the first rigid substrate 11 with the second rigid substrate 12, and forming a dye liquid crystal layer 7 between the first alignment layer 51 and the second alignment layer 52; and
separating the first rigid substrate 11 and the first bonding layer 21 from the first flexible substrate 31 and separating the second rigid substrate 12 and the second bonding layer 22 from the second flexible substrate 32.

In the present embodiment, the first rigid substrate 11, the second rigid substrate 12, the first bonding layer 21, and the second bonding layer 22 are all carriers in the process of manufacturing the light-adjusting structure, and the first rigid substrate 11, the second rigid substrate 12, the first bonding layer 21, and the second bonding layer 22 need to be removed after the manufacturing of the light-adjusting structure is completed.

With the light-adjusting structure of the present embodiment, a switching between a transparent state and a black state can be achieved, a better matching with a vehicle body can be realized when compared with a flexible PDLC (which may realize a switching between transparent and milky white), and a haze of the light-adjusting structure can be less than 1%, which can make an occupant in the vehicle to see the environment outside the vehicle clearly, and thus can satisfy the safety requirement more when compared with the flexible PDLC. When compared with a flexible EPD, the light-adjusting structure of the present embodiment has a smaller haze, and can achieve a double-curved structure, which can meet the requirement for the curvature of the vehicle window. When compared with the flexible ECD (with a response speed of 0.1 s to 0.9 s), the response speed of the liquid crystal in the light-adjusting structure of the present embodiment can be less than 40 ms, which can meet the fast response requirement of the vehicle window.

In the present embodiment, the first flexible substrate 31 and the second flexible substrate 32 may be made by any of PET (polyethylene terephthalate), COP (cyclic olefin polymer), CPI (transparent polyimide), or TAC (triacetate). When the light-adjusting structure is applied to a vehicle window, the first flexible substrate 31 and the second flexible substrate 32 do not break when the vehicle encounters an impact and do not threaten the safety of the occupant in the vehicle. In order to meet curvature requirement of the vehicle window, a radius of curvature of the first flexible substrate 31 and a radius of curvature of the second flexible substrate 32 in the x-axis direction need to be greater than 1800 mm and a radius of curvature the first flexible substrate 31 and a radius of curvature of the second flexible substrate 32 in the y-axis direction need to be greater than 2000 mm.

The thickness of the first flexible substrate 31 and that of the second flexible substrate 32 may be 40 μm to 200 μm, the thermal shrinkage rate of the first flexible substrate 31 and that of the second flexible substrate 32 in the x-axis direction are less than or equal to 0.03%, and the thermal shrinkage rate of the first flexible substrate 31 and that of the second flexible substrate 32 in the y-axis direction is less than or equal to 0.03%. If the thermal shrinkage rate of the first flexible substrate 31 and that of the second flexible substrate 32 is greater than 0.03%, the first flexible substrate 31 and the second flexible substrate 32 would have a large deformation when being at a high temperature of 110 degrees centigrade or more, while the thermal shrinkage rate of a rigid substrate, such as a glass substrate, is almost negligible. In a case that the first flexible substrate 31 and the second flexible substrate 32 are attached to a rigid substrate and a thermal shrinkage occurs, the rigid substrate may be warped due to the thermal shrinkage of the first flexible substrate 31 and the second flexible substrate 32, resulting in that the whole process cannot be carried out. Therefore, it is required that the first flexible substrate 31 and the second flexible substrate 32 cannot undergo a large deformation in the case that they are attached to the rigid substrate and are heated. Therefore, the thermal shrinkage of the first flexible substrate 31 and that of the second flexible substrate 32 in the x-axis direction are less than or equal to 0.03%, and the thermal shrinkage of the first flexible substrate 31 and that of the second flexible substrate 32 in the y-axis direction are less than or equal to 0.03%. In particular, the first flexible substrate 31 and the second flexible substrate 32 may have a thermal shrinkage rate of 0.002% in the x-axis direction and a thermal shrinkage rate of 0.002% in the y-axis direction.

In the present embodiment, in order to ensure the transmittance of the light-adjusting structure, the electrode may be made by a transparent conductive material such as ITO, and the transmittance for the first flexible substrate 31 and the second flexible substrate 32 is greater than 80%.

In order to ensure the performance of the light-adjusting structure, the square resistance of the first transparent electrode 41 and that of the second transparent electrode 42 may be in a range of 20Ω/□ to 200Ω/□.

In the light-adjusting structure of the present embodiment, the temperature tolerance range of the first flexible substrate 31 and that of the second flexible substrate 32 are 100 degrees centigrade to 170 degrees centigrade. Since the first flexible substrate 31 and the second flexible substrate 32 with the temperature tolerance of 170 degrees centigrade or less are used, and the temperature tolerance of the first bonding layer 21 and that of the second bonding layer 22 are also less than 120 degrees centigrade, the light-adjusting structure of the present embodiment is manufactured by a low temperature process. In the present embodiment, when manufacturing the light-adjusting structure, the first flexible substrate 31 and the second flexible substrate 32 are attached to the first rigid substrate 11 and the second rigid substrate 12 by the first bonding layer 21 and the second bonding layer 22, respectively. Since the temperature tolerance range of the first flexible substrate 31 and that of the second flexible substrate 32 are 100 degrees centigrade to 170 degrees centigrade, the de-bonding temperature of the first bonding layer 21 and that of the second bonding layer 22 need to be lower than 170 degrees centigrade, such as lower than 150 degrees centigrade, otherwise the first flexible substrate 31 and the second flexible substrate 32 would be easily damaged. If the de-bonding temperature of the first bonding layer 21 and that of the second bonding layer 22 are lower than 150 degrees centigrade, it is required that the temperature of other processes has a temperature difference of at least 40 degrees centigrade from the de-bonding temperatures for the first bonding layer 21 and the second bonding layer 22, otherwise the first bonding layer 21 and the second bonding layer 22 will be partially de-bonded during such processes, affecting the normal manufacturing of the product. Thus, all the process temperatures and material temperatures preferably satisfy the temperature requirement of 110 degrees centigrade or less, i. e. the light-adjusting structure can be manufactured at 110 degrees centigrade or less.

The temperature tolerance range of the first alignment layer 51 and that of the second alignment layer 52 is 100 degrees centigrade to 130 degrees centigrade, and in particular, the first alignment layer 51 and the second alignment layer 52 may be a liquid crystal alignment film that is white in a normal state, and has a curing temperature of about 100 degrees centigrade and a curing time of about 90 s. The spacer 6 uses a spacer material with a curing temperature of 90 degrees centigrade to 110 degrees centigrade, and in particular, a black spacer material which is sticky and has a curing temperature of 110 degrees centigrade and a curing time of 1 hour can be used in the present embodiment. The black spacer material needs to be melt and bonded to the flexible substrate at 110 degrees centigrade or less, to support the thickness of the box without sliding.

The light-adjusting structure of this embodiment is manufactured by a low temperature process, and the film layer material used is a material for the low temperature process. This can not only prevent the first flexible substrate 31 and the second flexible substrate 32 from being damaged, but also can prevent the first bonding layer 21 and the second bonding layer 22 from having adverse reactions when the temperature is too high, resulting in a difficulty in peeling the first flexible substrate 31 off from the first rigid substrate 11 and peeling the second flexible substrate 32 off from the second rigid substrate 12 during the manufacturing process.

The dye liquid crystal of this embodiment can use a dye liquid crystal with a temperature tolerance range of −40 degrees centigrade to 150 degrees centigrade, and the liquid crystal at a high temperature of 150 degrees centigrade can recover to a normal operating state after 1 hour without affecting the reliability. There is no dye crystallization for the liquid crystal at −40° C., and the liquid crystal can operate normally after recovery to the normal temperature without damaging the device orientation and optical performance.

In some embodiments, the step of forming the first transparent electrode 41 includes:
  forming a full layer of planar electrode; or
  forming a plurality of block-shaped sub-electrodes independent of one another; or
  forming a plurality of character-patterned sub-electrodes independent of one another.

In the present embodiment, the first transparent electrode 41 and the second transparent electrode 42 may be a full layer of planar electrode, to achieve a function of light-adjusting on the whole surface. The first transparent electrode 41 may also include a plurality of block-shaped sub-electrodes independent of one another, so that a function of light-adjusting for separated regions can be realized; the plurality of block-shaped sub-electrodes independent of one another may be formed by etching a full layer of electrode with a laser, and the wavelength range of the laser may be 200 nm to 380 nm. Then, the function of light-adjusting for separated regions can be realized by independently controlling each block-shaped sub-electrode, that is, for the light-adjusting structure, a certain region may be lighted up to implement the light-adjusting for that region, and other parts maintain a transparent state or a black state, and a driving voltage may be 0 V to 24 V. In order to avoid a mutual influence of adjacent separated regions, a spacing between adjacent block-shaped sub-electrodes is greater than or equal to 40 μm. It is also possible to perform a complex patterning process on the first transparent electrode 41, so that simple characters, such as information about the electric quantity, temperature, and time of the vehicle, may be displayed by the first transparent electrode 41, and the first transparent electrode 41 includes a plurality of character-patterned sub-electrodes independent of one another. Specifically, the character-patterned sub-electrodes may be manufactured by a process such as exposure, development and etching. In order to prevent the first flexible substrate 31 and the second flexible substrate 32 from being damaged, and in addition, prevent the first bonding layer 21 and the second bonding layer 22 from being subjected to an adverse reaction due to over-temperature, the annealing temperature is less than or equal to 150 degrees centigrade when forming a transparent electrode material layer. In order to avoid the mutual influence of adjacent character patterns, a spacing between the adjacent character-patterned sub-electrodes is greater than or equal to 2 μm. A PM (passive) driving mode with a chip may be used to achieve a dynamic displaying of different information, and the driving voltage is adjustable between 0 V and 16 V. It should be noted that the overall transmittance of the light-adjusting structure needs to be higher than 40%.

It should be understood that various embodiments described in the specification are described in a progressive manner, the same and similar parts can be referenced throughout the various embodiments, and each of the embodiments is intended to cover variations from the other embodiments. Particularly, the method embodiments are similar to product embodiments, and therefore are described briefly. For a related part, references can be made to the descriptions in the product embodiments.

Unless defined otherwise, technical or scientific terms used in the present disclosure should have the ordinary meaning as understood by one of ordinary skill in the art to which the disclosure belongs. The use of "first", "second", and the like in this disclosure do not represent any order, quantity, or importance, but are just to distinguish different components. The word "comprises" or "includes", and the like, mean that the presence of an element or item preceding the word encompasses the presence of the element or item listed after the word and equivalents thereof, but does not exclude other elements or items. The words "Connect", "couple" or similar words are not limited to physical or mechanical connection, but can include electrical connection, either direct or indirect. The terms "upper", "lower", "left", "right" and the like only indicate relative positional relationships, which can be changed accordingly when the absolute position of the described object changes.

It can be understood that when an element such as a layer, film, region or substrate is referred to as being "on" or "under" another element, it can be "directly on" or "under" the other element, or any intervening element may be present therebetween.

In the description of the above embodiments, particular features, structures, materials, or characteristics can be combined in any suitable manner in any one or more embodiments or examples.

The above embodiments are merely specific implementations of the present disclosure, but the protection scope of the present disclosure is not limited thereto, and any modification and substitution that can be readily conceived by those skilled in the art without departing from the technical scope of the present disclosure fall within the protection scope of the present disclosure. Therefore, the protection scope of the disclosure is set forth in the appended claims.

What is claimed is:

1. A light-adjusting structure, comprising:
    a first flexible substrate and a second flexible substrate, the first flexible substrate and the second flexible substrate being oppositely arranged;
    a first transparent electrode and a second transparent electrode, the first transparent electrode and the second transparent electrode being located between the first flexible substrate and the second flexible substrate;
    a first alignment layer, located at a side of the first flexible substrate facing towards the second flexible substrate;
    a second alignment layer, located at a side of the second flexible substrate facing towards the first flexible substrate; and
    a spacer and a dye liquid crystal layer, the spacer and the dye liquid crystal layer being located between the first alignment layer and the second alignment layer;
    wherein a thickness of the dye liquid crystal layer is 6 μm to 50 m;
    a thickness of the light-adjusting structure is 0.15 mm to 0.38 mm;
    wherein a temperature tolerance of the first flexible substrate is in a range of 100 degrees centigrade to 170 degrees centigrade, a temperature tolerance of the second flexible substrate is in a range of 100 degrees centigrade to 170 degrees centigrade, a temperature tolerance of the first alignment layer is in a range of 100 degrees centigrade to 130 degrees centigrade, a temperature tolerance of the second alignment layer is in a range of 100 degrees centigrade to 130 degrees centigrade, a curing temperature of the spacer is in a range of 90 degrees centigrade to 110 degrees centigrade, and a temperature tolerance of the dye liquid crystal is in a range of −40 degrees centigrade to 150 degrees centigrade.

2. The light-adjusting structure according to claim 1, wherein,
    the first transparent electrode is located at a side of the first flexible substrate facing towards the second flexible substrate;
    the second transparent electrode is located at a side of the second flexible substrate facing towards the first flexible substrate.

3. The light-adjusting structure according to claim 1, wherein,
    the first transparent electrode is a full layer of planar electrode; or
    the first transparent electrode comprises a plurality of block-shaped sub-electrodes independent of one another; or the first transparent electrode comprises a plurality of character-patterned sub-electrodes independent of one another.

4. The light-adjusting structure according to claim 3, wherein,
a spacing between adjacent block-shaped sub-electrodes of the plurality of block-shaped sub-electrodes is greater than or equal to 40 µm; or,
a spacing between adjacent character-patterned sub-electrodes of the plurality of character-patterned sub-electrodes is greater than or equal to 2 µm.

5. The light-adjusting structure according to claim 1, wherein,
a thickness of the first flexible substrate is 40 µm to 200 µm, a transmittance of the first flexible substrate is greater than 80%, a radius of curvature of the first flexible substrate in the x-axis direction is greater than 1800 mm, and a radius of curvature of the first flexible substrate in the y-axis direction is greater than 2000 mm;
a thickness of the second flexible substrate is 40 µm to 200 µm, a transmittance of the second flexible substrate is greater than 80%, a radius of curvature of the second flexible substrate in the x-axis direction is greater than 1800 mm, and a radius of curvature of the second flexible substrate in the y-axis direction is greater than 2000 mm.

6. A light-adjusting module, comprising a light-adjusting structure according to claim 1;
wherein the light-adjusting module further comprises:
a flexible circuit board, bonded to the light-adjusting structure, wherein the flexible circuit board is bonded to the light-adjusting structure by an anisotropic conductive (ACF) adhesive, and a diameter of a gold particle in the ACF adhesive is greater than 20 µm.

7. The light-adjusting module according to claim 6, wherein the light-adjusting module further comprises a first tempered glass and a second tempered glass oppositely arranged, the light-adjusting structure is located between the first tempered glass and the second tempered glass, and the light-adjusting structure is fixed at a side of the first tempered glass facing towards the second tempered glass by an adhesive layer.

8. The light-adjusting module according to claim 7, wherein the light-adjusting structure and the second tempered glass are spaced apart with a distance; or
a side of the light-adjusting structure away from the first tempered glass is fixed to the second tempered glass by the adhesive layer.

9. The light-adjusting module according to claim 6, wherein the light-adjusting module further comprises:
a tempered glass, wherein light-adjusting structure is fixed to the tempered glass by an adhesive layer;
a protective film, covering the light-adjusting structure.

10. The light-adjusting module according to claim 6, wherein,
the first transparent electrode is located at a side of the first flexible substrate facing towards the second flexible substrate;
the second transparent electrode is located at a side of the second flexible substrate facing towards the first flexible substrate.

11. The light-adjusting module according to claim 6, wherein,
the first transparent electrode is a full layer of planar electrode; or
the first transparent electrode comprises a plurality of block-shaped sub-electrodes independent of one another; or
the first transparent electrode comprises a plurality of character-patterned sub-electrodes independent of one another.

12. The light-adjusting module according to claim 11, wherein,
a spacing between adjacent block-shaped sub-electrodes of the plurality of block-shaped sub-electrodes is greater than or equal to 40 µm; or,
a spacing between adjacent character-patterned sub-electrodes of the plurality of character-patterned sub-electrodes is greater than or equal to 2 µm.

13. The light-adjusting module according to claim 6, wherein,
a thickness of the first flexible substrate is 40 µm to 200 µm, a transmittance of the first flexible substrate is greater than 80%, a radius of curvature of the first flexible substrate in the x-axis direction is greater than 1800 mm, and a radius of curvature of the first flexible substrate in the y-axis direction is greater than 2000 mm;
a thickness of the second flexible substrate is 40 µm to 200 µm, a transmittance of the second flexible substrate is greater than 80%, a radius of curvature of the second flexible substrate in the x-axis direction is greater than 1800 mm, and a radius of curvature of the second flexible substrate in the y-axis direction is greater than 2000 mm.

14. A method for manufacturing a light-adjusting structure, comprising:
providing a first rigid substrate;
forming a first bonding layer on the first rigid substrate;
forming a first flexible substrate on the first bonding layer;
forming a first transparent electrode on the first flexible substrate;
forming a first alignment layer and a spacer on a side of the first transparent electrode away from the first flexible substrate;
providing a second rigid substrate;
forming a second bonding layer on the second rigid substrate;
forming a second flexible substrate on the second bonding layer;
forming a second transparent electrode on the second flexible substrate;
forming a second alignment layer on a side of the second transparent electrode away from the second flexible substrate;
cell-assembling the first rigid substrate with the second rigid substrate, and forming a dye liquid crystal layer between the first alignment layer and the second alignment layer; and
separating the first rigid substrate and the first bonding layer from the first flexible substrate, and separating the second rigid substrate and the second bonding layer from the second flexible substrate;
wherein a thickness of the dye liquid crystal layer is 6 µm to 50 µm;
a thickness of the light-adjusting structure is 0.15 mm to 0.38 mm;
wherein a temperature tolerance of the first flexible substrate is in a range of 100 degrees centigrade to 170 degrees centigrade, a temperature tolerance of the second flexible substrate is in a range of 100 degrees centigrade to 170 degrees centigrade, a temperature tolerance of the first alignment layer is in a range of 100 degrees centigrade to 130 degrees centigrade, a temperature tolerance of the second alignment layer is in a range of 100 degrees centigrade to 130 degrees centigrade, a curing temperature of the spacer is in a range of 90 degrees centigrade to 110 degrees centigrade, and a temperature tolerance of the dye liquid crystal is in a range of −40 degrees centigrade to 150 degrees centigrade.

15. The method for manufacturing a light-adjusting structure according to claim 14, wherein the forming the first transparent electrode, comprising:
   forming a full layer of planar electrode; or
   forming a plurality of block-shaped sub-electrodes independent of one another; or
   forming a plurality of character-patterned sub-electrodes independent of one another.

\* \* \* \* \*